UNITED STATES PATENT OFFICE.

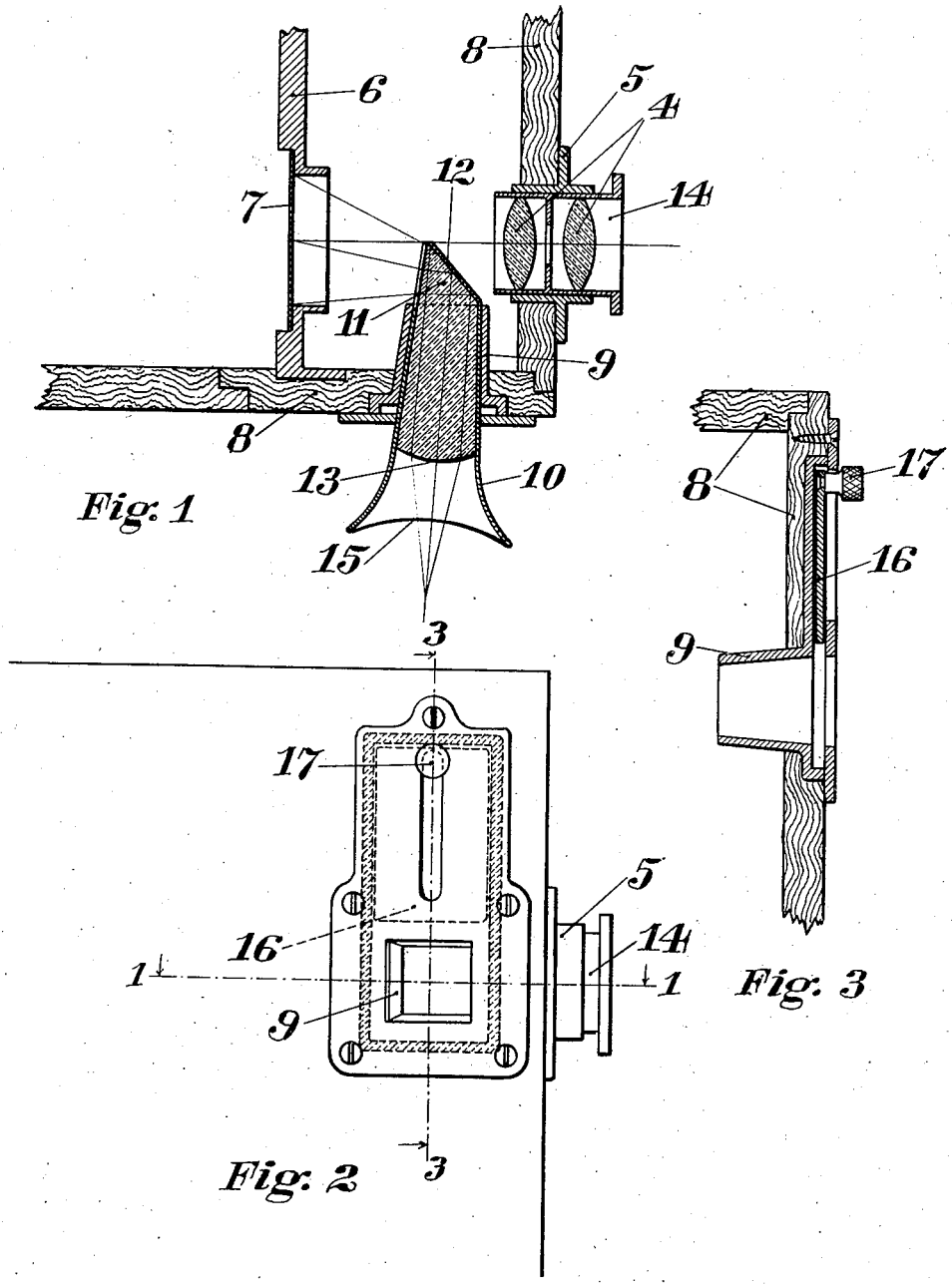

ERNEST W. DAVIS, OF CHICAGO, ILLINOIS.

FOCUSING DEVICE.

1,276,733.　　　　Specification of Letters Patent.　　Patented Aug. 27, 1918.

Application filed March 16, 1917.　Serial No. 155,196.

*To all whom it may concern:*

Be it known that I, ERNEST W. DAVIS, a citizen of the United States, residing at Chicago, in the county of Cook and State of Illinois, have invented a new and useful Improvement in Focusing Devices, of which the following is a full, clear, and exact description.

My invention relates to focusing devices as applied to cameras and more particularly to the focusing devices of moving picture cameras.

The object of this invention is to provide means whereby a lens may be accurately focused to throw a sharp image on a receiving surface, such, for instance, as a moving picture film, where extreme precision of focus is desirable.

The above named object is accomplished by providing means for viewing the image on the photographic film from the front side instead of from the back. In prior devices, where the image on the film is viewed through the film itself, the illumination is usually insufficient for good focusing and the image is somewhat blurred by diffusion, as also occurs when ground glass or ground film is used to replace the photographic film.

This invention comprises a reflecting surface, preferably a prism, located in front of the film and arranged to reflect the image on the emulsion through an aperture in the camera case, so that the operator may view the image as it actually exists where the photographic exposure is made.

A suitable eye piece may be used for excluding external sources of light while the operator is viewing the image.

A magnifying lens located in the eye piece is advantageous for accurate focusing and may be made integral with the prism, if so desired.

A specific embodiment of this invention is illustrated in the accompanying drawing in which—

Figure 1 is a sectional plan showing the position of the prism relative to the aperture plate and camera lens.

Fig. 2 is an elevation of the camera case showing the aperture in which the eyepiece containing the prism may be inserted.

Fig. 3 is a sectional elevation through the eyepiece holder showing the arrangement of the slide for excluding the light when the eyepiece is withdrawn.

Referring to Fig. 1, a moving picture camera lens 4, is provided with a lens barrel 14, and a sleeve 5, through which the lens barrel 14 may be moved longitudinally. The aperture plate 6, is arranged to carry the photographic film 7, which may be intermittently advanced by any of the well known devices used for that purpose.

The camera case 8, has an opening to receive the eyepiece holder 9, which is arranged to hold the eyepiece 10, in the position indicated. The eyepiece 10, contains a prism 11, having a reflecting surface 12, arranged to reflect the image on the film 7, through the eyepiece 10. A convex lens 13, integral with the prism 11, enlarges the image and permits focusing with the operator's eye pressed tightly against the rim 15, which is curved to fit the eye thereby excluding external light.

In operation the operator looks through the lens 13, and prism 11, and sees the image on the film 7, which is produced by the lens 4. He then moves the lens barrel 14, in or out until the picture is accurately focused. The eye-piece 10, is then removed, leaving the eyepiece holder 9, empty as shown in Fig. 3, when the slide 16, may be lowered by means of the knob 17, thereby excluding light from the camera, which is then in focus and ready for operation.

It has been determined by practice that the prism 11, may be inserted to the amount shown in Fig. 1, *i. e.*, to the center line of the lens 4, without greatly diminishing the apparent illumination of any part of the image. Any further insertion however, diminished the illumination quite rapidly.

I am aware that prior to my invention moving picture cameras have been constructed, in which a prism is interposed between the lens and the film, for the purpose of reflecting the rays of light from the lens onto a fixed ground glass, but I am not aware that a prism has ever been arranged to reflect the image from the front of the sensitive film through an aperture in the camera case.

I claim:

1. In combination, a lens adapted to produce an image, a receiving surface arranged to receive said image, a light excluding casing having an aperture therein and surrounding the space between said lens and said receiving surface, and a reflecting surface interposed between said lens and said receiving surface and arranged to reflect said image through said aperture.

2. In combination, a lens adapted to produce an image, a receiving surface arranged to receive said image, an eyepiece, and a reflecting surface interposed between said lens and said receiving surface and arranged to reflect said image through said eyepiece.

3. In combination, a camera lens arranged to produce an image on a receiving surface, a magnifying lens, and a reflecting surface interposed between said camera lens and said receiving surface and arranged to reflect said image through said magnifying lens.

4. In combination, a camera lens arranged to produce an image on a receiving surface, a prism having a reflecting surface, and a magnifying lens, said prism being interposed between said camera lens and said receiving surface and arranged to reflect said image through said magnifying lens.

5. In combination, a camera lens arranged to produce an image on a receiving surface, a prism having a reflecting surface, a magnifying lens integral with said prism, said prism being interposed between said camera lens and said receiving surface and arranged to reflect said image through said magnifying lens.

6. In a focusing device, the combination with a photographic film and a lens arranged to produce an image on said film, of a light excluding casing having an aperture therein and surrounding the space between said lens and said film, and a single reflecting surface forward of said film and arranged to reflect the image on said film through said aperture.

In testimony whereof I affix my signature in the presence of two witnesses.

ERNEST W. DAVIS.

Witnesses:
A. V. DOUGLASS,
HENRY E. WISTEN.